United States Patent [19]
Koch et al.

[11] 3,840,317
[45] Oct. 8, 1974

[54] TWO PART MOLD CLOSURE AND CLAMPING SYSTEM

[75] Inventors: Friedrich Koch; Harke Claus Paulsen, both of Achim, Germany

[73] Assignee: Desma-Werke Gesellschaft mit beschrankter Haftung, Uesen, Germany

[22] Filed: Sept. 11, 1972

[21] Appl. No.: 287,615

[30] Foreign Application Priority Data
Sept. 16, 1971 Germany.............................. 2146245

[52] U.S. Cl................................. 425/450, 249/161
[51] Int. Cl.............................................. B28b 7/02
[58] Field of Search........... 425/450, DIG. 128, 442; 249/162, 161, 170, 171; 164/342-344, 137; 99/376, 377, 379, 380

[56] References Cited
UNITED STATES PATENTS

| | | | |
|---|---|---|---|
| 1,552,247 | 9/1925 | Thompson | 249/161 X |
| 2,338,280 | 1/1944 | Brundage | 425/450 X |
| 3,161,911 | 12/1964 | Mathews | 249/161 X |

FOREIGN PATENTS OR APPLICATIONS

| | | | |
|---|---|---|---|
| 1,245,314 | 12/1965 | France | 425/450 |

*Primary Examiner*—Andrew R. Juhasz
*Assistant Examiner*—John S. Brown
*Attorney, Agent, or Firm*—G. Eugene Dacey

[57] ABSTRACT

A mold comprising hingedly connected supports movable angularly relative to each other on which are mounted mold parts, abutments on the supports which limit movement of the supports toward each other to positions in which the mold parts are substantially parallel and spaced from each other, guides mounting the mold part on one of the supports for movement at the limiting position of the supports relative to the supports and rectilinearly toward the mold part on the other support, springs holding the movable mold part retracted and linkage operable to move the supports to said limiting position and thereafter to move the movable mold part on the one support into engagement with the mold part on the other support.

2 Claims, 4 Drawing Figures

TWO PART MOLD CLOSURE AND CLAMPING SYSTEM

BACKGROUND OF INVENTION

Two-part molds for producing molded articles are in common use and conventionally the mold parts are mounted on supports which are hinged to enable moving the mold parts angularly toward and from each other—toward each other to provide a mold cavity into which a moldable material is adapted to be injected for molding and apart to permit removing the finished article following vulcanization or fusing depending upon the molding material which is employed. Such apparatus may be used for making parts of shoes, for example soles. If the article being molded is relatively thick, the arcuate, swinging movement of the movable part of the mold relative to the fixed part of the mold tends to break off the edges of the article since the material at this point is quite tender and so there is a rather high percentage of rejects. The primary purpose of this invention is to provide a mold constructed and arranged to enable separating the parts without damage to the molded article in its tender condition and further to provide a mold which is of relatively simple construction and is adapted to be used with conventional molding procedures.

SUMMARY OF INVENTION

As herein illustrated the mold according to this invention comprises hingedly connected supports movable angularly relative to each other on which there are mounted mold parts which collectively form a mold cavity of the desired shape, abutments on the supports which by mutal engagement limit movement of the supports toward each other to positions in which the mold parts are substantially parallel and spaced from each other at a predetermined spacing, guide members mounting the mold part on one of the supports for movement thereon at the limiting position of the supports relative to the other mold part in a direction rectilinearly toward the other mold part, spring means holding the movable mold part retracted and linkage operable to move the supports relative to each other to such limiting positions and thereafter to move the movable mold part into engagement with the fixed mold part said linkage being operable reversely to permit the movable mold part to move in a direction rectilinearly away from the other mold part, and thereafter move the supports away from each other. Preferably one of the supports is fixed and may be the platen of a turret on which a number of such molds are mounted for rotation relative to an injection apparatus. The other support is pivotally mounted to the one support and there is an abutment on one support and an adjustable screw on the other which by mutual engagement when the supports are swung angularly towards each other to limit the movement of the movable support to a position substantially parallel to and spaced from the fixed support. The guides mounting the mold parts on the movable support are in the form of spindles mounted in vertically disposed holes formed in the movable support, the lower ends of the spindles being fixed to the mold part. The upper ends of the spindles have adjustably mounted thereon within the holes, bushing members, and coil springs are disposed about these spindles, with their lower ends fixed with respect to the support and their upper ends bearing against the bushings, so as to hold the mold retracted against the support. The linkage for effecting angular movement of the supports toward and from each other and for effecting rectilinear movement of the movable mold part toward the fixed mold part comprises a pair of spaced parallel lever arms pivotally supported intermediate their ends on the fixed support and a link pivotally connecting at one end to upper ends of the lever arms and at its other end to the movable support, the lever arms being operable by angular movement about their pivot axis, to swinging the movable support into a position of parallelism with the fixed support and thereafter to move mold part on the movable support rectilinearly into engagement with the fixed mold part. A motor is provided for effecting angular movement of the lever, and a stop is provided for limiting angular movement in a direction of separation of the supports.

The invention will now be described with reference to the accompanying drawings wherein.

Figure 1:
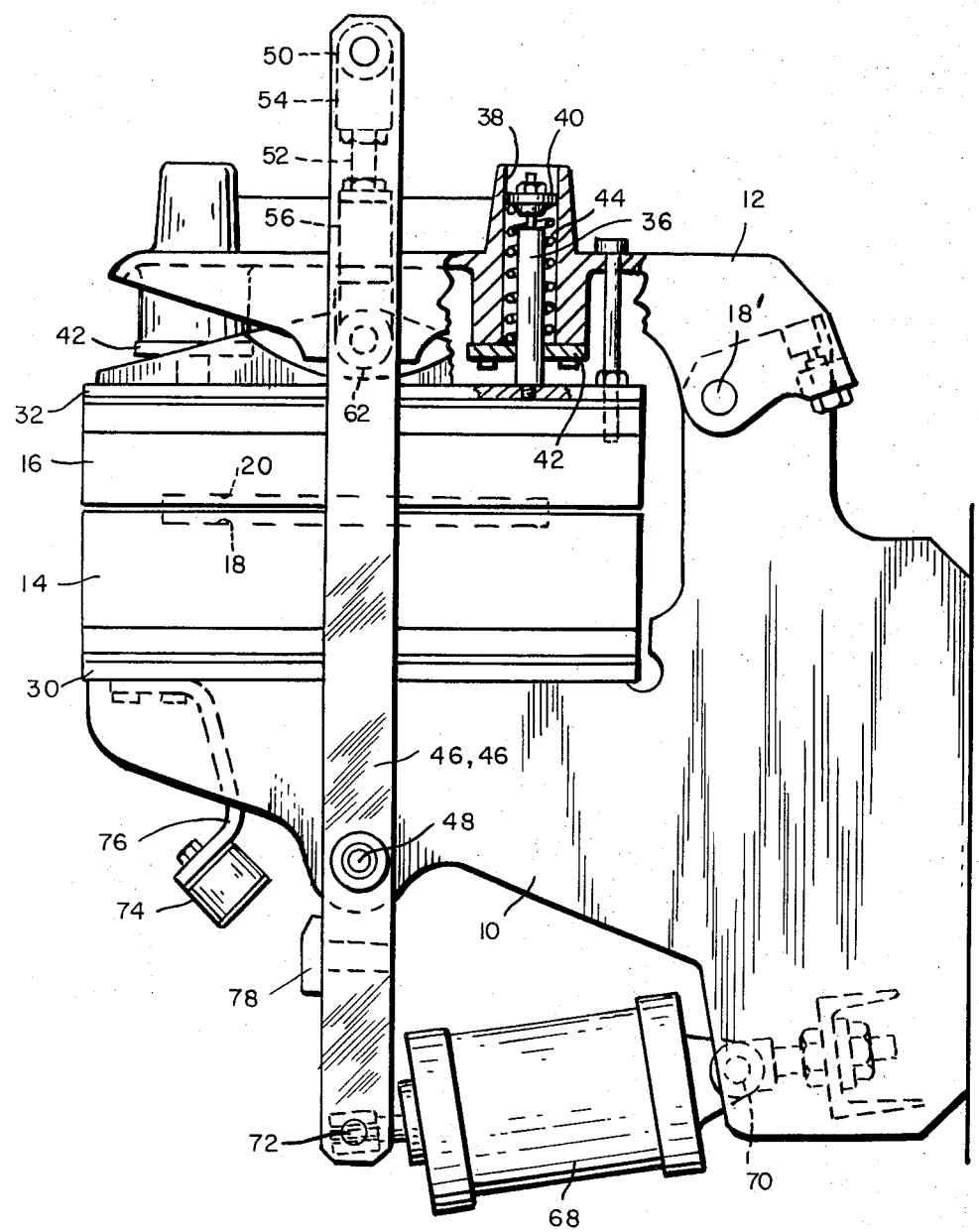
FIG. 1 is an elevation of one side of the apparatus with parts in sections showing the mold parts engaged for an injection of material into the mold cavity or for vulcanization of fusing of material already in the mold cavity.

Referring to the drawings, the apparatus of this invention comprises fixed and movable supports 10 and 12 on which there are mounted mold parts 14 and 16 containing cavities 18 and 20 which collectively define when the mold parts 14 and 16 are engaged as shown in FIG. 1, a composite cavity corresponding in configuration to the part to be made.

The support 10 may comprise a part of the turret of a multiple mold molding apparatus on which there are mounted a plurality of mold assemblies such as herein shown adapted to be moved around relative to injection apparatus or relative to a station where an operator merely deposits a biscuit of moldable material in the mold cavity while the molds are separated from each other.

Figure 2:
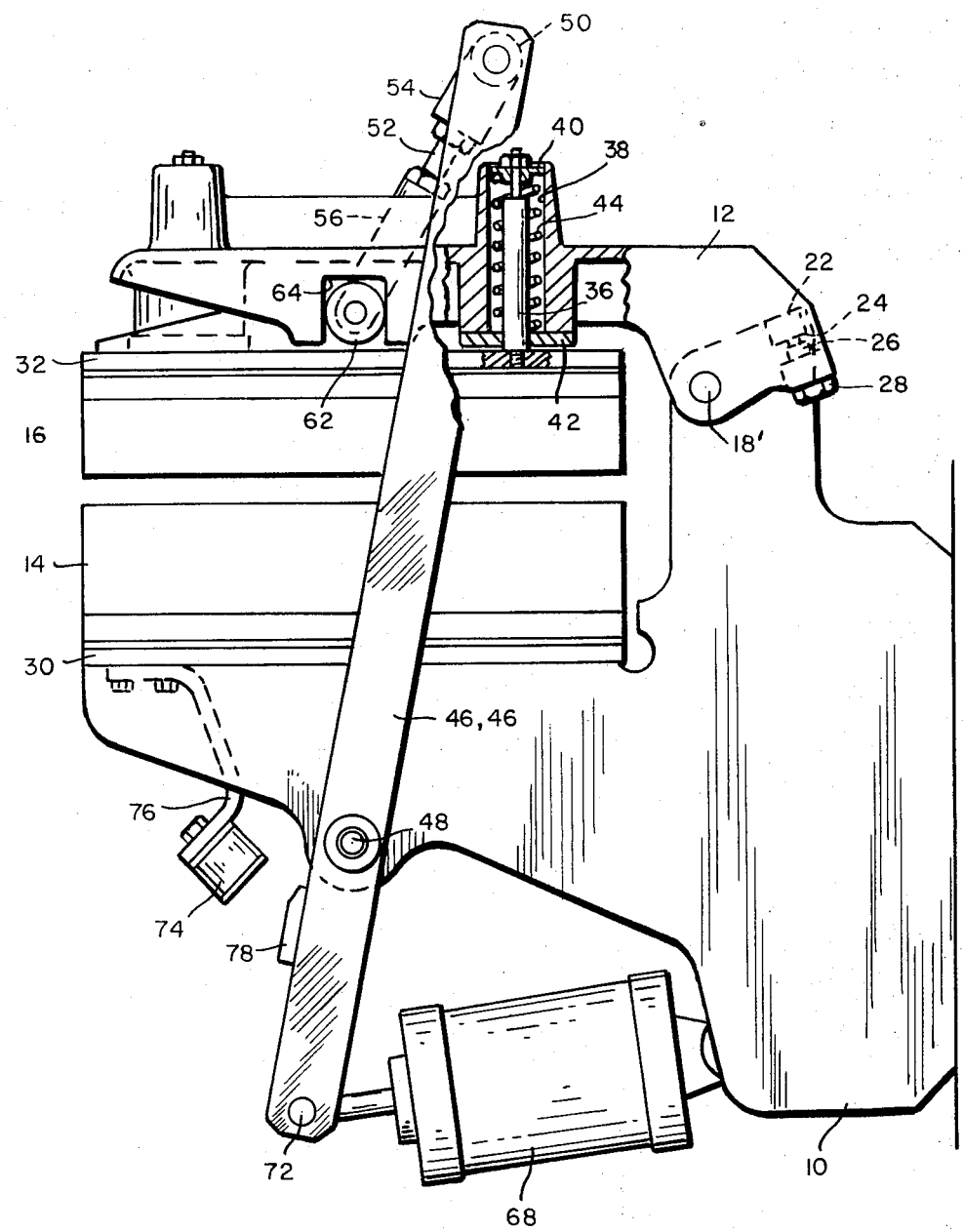
FIG. 2 is a view similar to FIG. 1 showing the mold parts separated with the movable mold part vertically above the fixed mold part.
Figure 3:
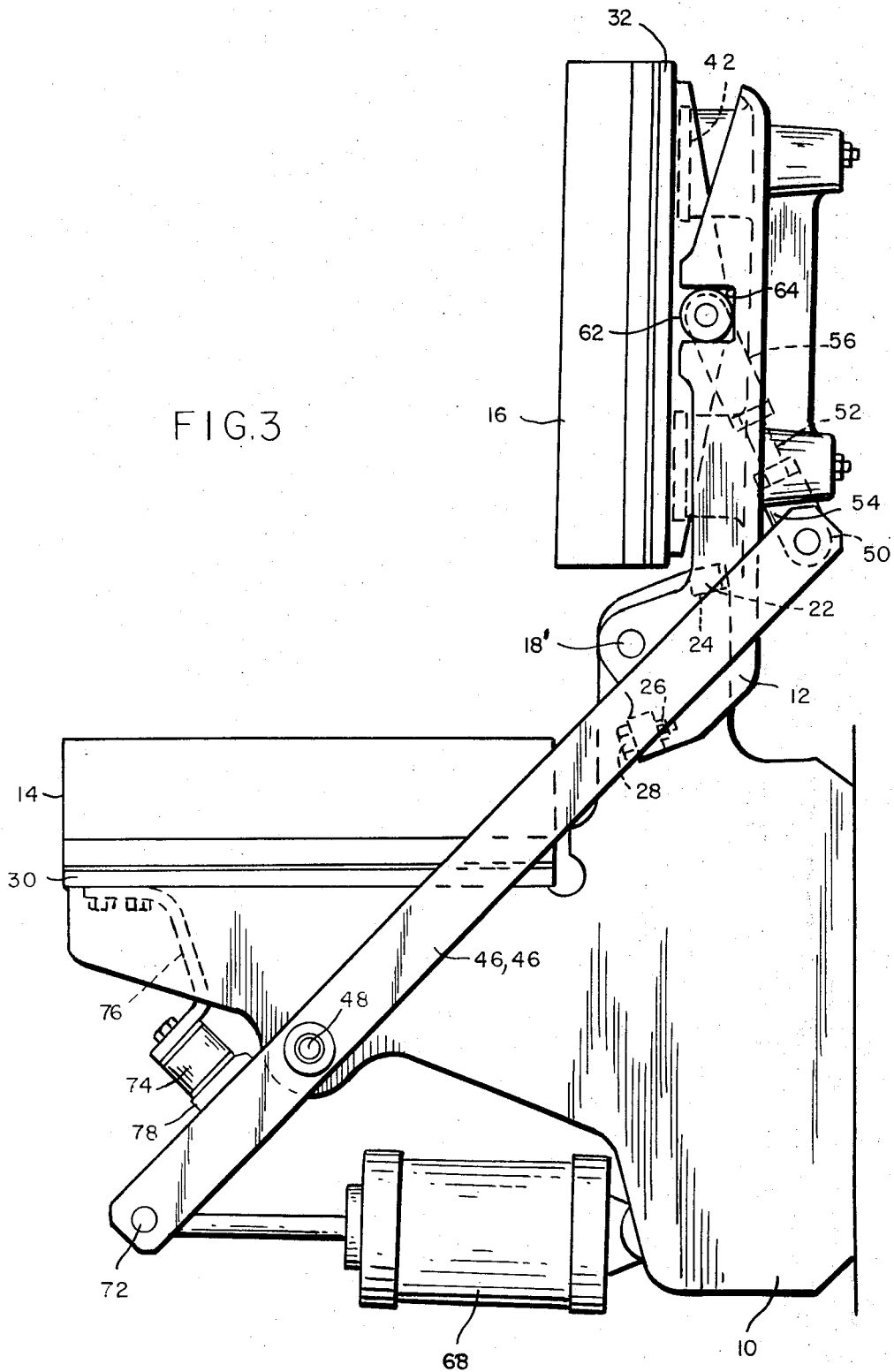
FIG. 3 is an elevation showing the mold parts in a position of separation with the movable mold part swung angularly away from the fixed mold part.

The movable support 12 is pivotally mounted on the fixed support 10 by means of a pivot pin 18' so that it may be swung angularly relative to the fixed support from a position substantially parallel to the fixed support to an upwardly and laterally disposed position as shown in FIG. 3. The fixed support has secured to it radially of the pivot pin 18' a block 22 the lower side of which provides a downwardly facing shoulder 24 and the movable support has adjustably mounted thereon a screw 26 provided with a head 28 by means of which it may be adjusted which is adapted to be engaged with the shoulder 24 when the movable support is moved from its retracted position to a position confronting the fixed support to hold the movable support in spaced parallel relation to the fixed support as shown in FIG. 2. The parallelism of the two supports may be adjusted by adjustment of the screw 26.

The mold part 14 is fixed to its support for example by attaching plate 30. The mold part 16 is mounted to the movable support by means of an attaching plate 32, the latter being mounted on the movable support by means of spindles 36, the lower ends of which are fastened to the attaching plate 32. The spindles 36 extend upwardly through vertically disposed holes 38 in the movable support and have adjustably mounted at their upper ends within the holes bushings 40. Abutment plates 42 are mounted on the movable support at the lower ends of the holes 38 around the spindles, and coil springs 44 are mounted in the holes about the spindles with their lower ends resting against the bushings so that the springs, by exerting upward pressure on the bushings hold the mold 16 retracted against the lower side of the movable support. The spindles 36 provide guides which restrict movement of the mold part 16 to rectilinear movement relative to the movable support which as previously indicated is held in space parallel relation to the fixed support and hence rectilinear movement relative to the mold part 14. The adjustable bushings provide for making adjustments in the movement of the mold part 16 which would bring it into sealing engagement with the mold part 14.

Figure 4:
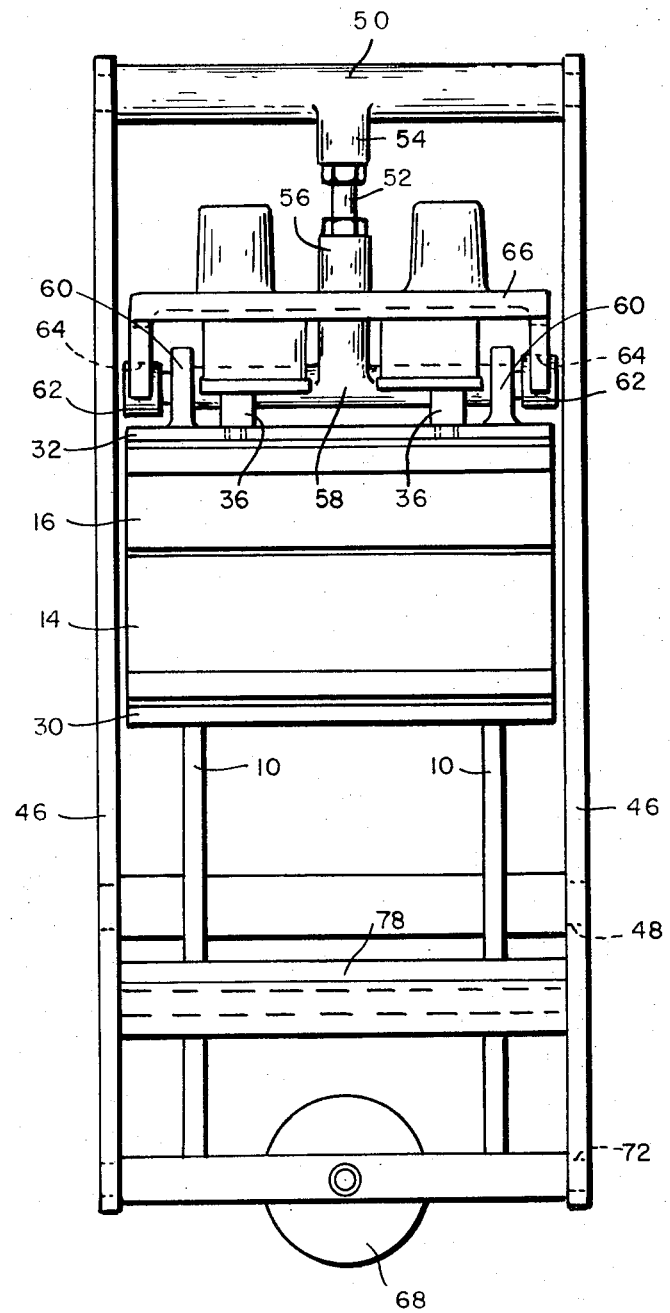
FIG. 4 is a front view of the apparatus as seen from the left side of FIG. 1.

Movement of the movable support 12 angularly relative to the fixed support 10 and rectilinear movement of the movable mold 16 relative to the fixed mold 14 is effected by linkage comprising space parallel lever arms 46-46 pivotally mounted at opposite sides of the mold parts as shown in FIG. 4 on the opposite ends of a shaft 48, the shaft in turn being mounted on the fixed support 10. The lever arms 46-46 extend upwardly in parallel relation and have mounted between their upward ends a cross-piece 50. A pressure-applying link 52 is threaded at one end into a boss 54 at the center of the cross-piece 50 and at its other end into a boss 56 connected to the center of a transverse shaft 58, the opposite ends of which are pivotally supported in transversely spaced bearings 60-60 secured to the upper side of the mounting plate 32 which carries the mold part 16. As thus constructed movement of the lever arms 46-46 from the angular positions shown in FIG. 3 in a counter-clockwise direction to the positions shown in FIG. 2 will bring the movable support 12 into a position of parallelism with the fixed support 10 in which position the screw 26 is engaged with the shoulder 24 so as to hold the supports in spaced parallel relation whereupon further movement of the lever arms 46-46 in a counter-clockwise direction will bring the lever arms 46-46 into parallel relation to the pressure-applying link 52, in which position the pivot axes of the lever arms, cross bar, and the shaft are in alignment, the supports are locked in their parallel positions and the movable mold part 16 is moved rectilinearly into engagement with the fixed mold part 14. To provide additional control in guiding of the mounting plate 32 rectilinearly with respect to its support 12, guide rollers 62-62 are mounted on the ends of the shaft 58 within guide slots 64-64 formed at the ends of a bar 66 comprising a part of the support 12.

Angular movement of the linkage is effected by means of a motor cylinder 68 pivotally connected at one end to a pin 70 to the fixed support 10, and its other end by a pin 72 to the lower ends of the lever arms 46-46. Angular displacement of the lever arms by means of the motor cylinder to elevate the movable support 12 to its retracted position is limited by a cushion block 74 mounted on the underside of the attaching plate 30 by means of a bracket arm 76 and a stop-plate 78 mounted to the lower ends of the lever arms 46-46.

The apparatus as thus constructed is adapted to be used for molding parts by injection of moldable material into the closed mold parts, that is, when the two parts of the mold are held in engagement with each other such as shown in FIG. 2 or by deposit of a biscuit of quantity of moldable material into the fixed mold part while the mold parts are held separated as shown in FIG. 3, and thereafter moved into engagement with each other. The significant feature of the apparatus as herein disclosed is that the supports on which the mold parts are mounted are so arranged as to move angularly relative to each other to bring the movable mold part from a retracted, laterally displaced position to a position directly above and in substantially parallel confronting relation to the fixed mold part and in spaced relation thereto and thereafter moving the movable mold part on the movable support rectilinearly relative to the fixed mold part to bring into engagement therewith and vice versa after the molding operation is completed to enable moving the movable mold part on its support rectilinearly away from the fixed mold part until it is clear of the molded article, so that by such rectilinear movement there is no possibility of applying lateral pressure to the article such as to cause crumbling of its edges in its tender condition and thereafter when it is completely clear of the article to move it angularly away from the fixed mold part to enable removing the article from the fixed mold part. The linkage as described not only effects angular movement and rectilinear movement but also locks the mold supports in position during the molding operation so that the faces of the molds are firmly enough engaged so that there is no chance of leakage. As related above, when the linkage is moved in a clockwise direction to effect release of the supports the one from the other, the springs automatically retract the movable mold part from the fixed mold part.

It should be understood that the present disclosure is for the purpose of illustration only and that this invention includes all modifications and equivalents falling within the scope of the appended claims.

We claim:

1. Molding apparatus comprising opposed mold parts, pivotally arranged supports, movable angularly relative to each other about a fixed pivot, means on the supports mutually engagable by angular movement of the supports toward each other to limit such movement to a predetermined spacing, means mounting the mold parts on the supports in parallel relation, the means mounting one of the mold parts operating to yieldably hold the one mold part spaced from the other at said predetermined spacing for rectilinear movement toward the other, first linkage operably connected to the supports such as to swing one support from an angularly retracted position to said predetermined spacing as limited by said mutually engagable means, and second linkage pivotally connected to the first linkage and to the yieldable mold part, said linkages when parallel holding the supports clamped at said predetermined position and the one mold part engaged with the other and when at an angle to each other allowing the one mold part to be retracted rectilinearly and releasing the supports for angular movement relative to each other.

2. Molding apparatus comprising opposed mold parts, pivotally arranged supports, movable angularly relative to each other about a fixed pivot, means on the supports cooperable to limit movement of the supports toward each other to a predetermined position of confrontation in which the supports are situated in spaced parallel relation, means mounting the mold parts on the supports in parallel relation, the means mounting one of the mold parts comprising guides on the support constrained to move rectilinearly thereon to which the one mold part is attached, said guides being movable on the support from a retracted position in which the one mold part is spaced from the other to an extended position in which the one mold part is engaged with the other mold part, springs holding the guides retracted and linkage operable to extend the guides and simultaneously lock the supports at said parallel position.

* * * * *